(12) United States Patent
Tanaka et al.

(10) Patent No.: US 8,170,299 B2
(45) Date of Patent: May 1, 2012

(54) IMAGE OUTPUT METHOD, IMAGE OUTPUT DEVICE, AND IMAGE OUTPUT PROGRAM

(75) Inventors: Takashige Tanaka, Matsumoto (JP); Kenji Matsuzaka, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 595 days.

(21) Appl. No.: 12/380,646

(22) Filed: Mar. 2, 2009

(65) Prior Publication Data

US 2009/0220159 A1    Sep. 3, 2009

(30) Foreign Application Priority Data

Feb. 28, 2008  (JP) ................................. 2008-047474

(51) Int. Cl.
*G06K 9/00* (2006.01)
(52) U.S. Cl. ...................................................... 382/118
(58) Field of Classification Search .................. 382/118
See application file for complete search history.

(56) References Cited

U.S. PATENT DOCUMENTS

| | | | |
|---|---|---|---|
| 6,272,231 B1 * | 8/2001 | Maurer et al. ................ | 382/103 |
| 7,391,888 B2 * | 6/2008 | Hu et al. ........................ | 382/118 |
| 2003/0012408 A1 * | 1/2003 | Bouguet et al. ............... | 382/103 |
| 2004/0240708 A1 * | 12/2004 | Hu et al. ........................ | 382/103 |
| 2004/0240711 A1 * | 12/2004 | Hamza et al. ................. | 382/118 |
| 2006/0115157 A1 | 6/2006 | Mori et al. | |

FOREIGN PATENT DOCUMENTS

| | | |
|---|---|---|
| JP | 2002191044 A | 7/2002 |
| JP | 2004-361989 | 12/2004 |
| JP | 2005056388 A | 3/2005 |
| JP | 2006072770 A | 3/2006 |

OTHER PUBLICATIONS

Machine Translation of JP 2004-361989 (Takashi et al.).*

* cited by examiner

*Primary Examiner* — Sath V Perungavoor
(74) *Attorney, Agent, or Firm* — Nutter McClennen & Fish LLP; John J. Penny, Jr.; Michael P. Visconti, III

(57) ABSTRACT

Provided is an image output method of outputting predetermined image data from plural pieces of image data, the method including: acquiring a group including plural pieces of image data which are similar to each other; detecting a face turning angle with respect to a face image plane included in an image indicated by each image data belonging to the same group and a face rotation angle indicating a rotation angle in the face image plane; and outputting image data, in which the face turning angle and the face rotation angle are smaller than those of other image data, among the image data belonging to the same group.

4 Claims, 7 Drawing Sheets

FIG. 5

IMAGE DATABASE

| GROUP | BELONGING IMAGE DATA | | | | | ... |
|---|---|---|---|---|---|---|
| G1 | 0002.jpg | 0003.jpg | 0003.jpg | 0004.jpg | 0005.jpg | ... |
| G2 | 0002.jpg | 0011.jpg | | | | ... |
| G3 | 0015.jpg | 0016.jpg | 0017.jpg | 0018.jpg | 0019.jpg | ... |
| G4 | 0030.jpg | 0031.jpg | 0032.jpg | | | ... |
| ⋮ | ⋮ | ⋮ | ⋮ | ⋮ | ⋮ | |

FIG. 6
FACIAL ORGAN DETECTING RESULT (GROUP G1)
THUMBNAIL (0001.jpg)
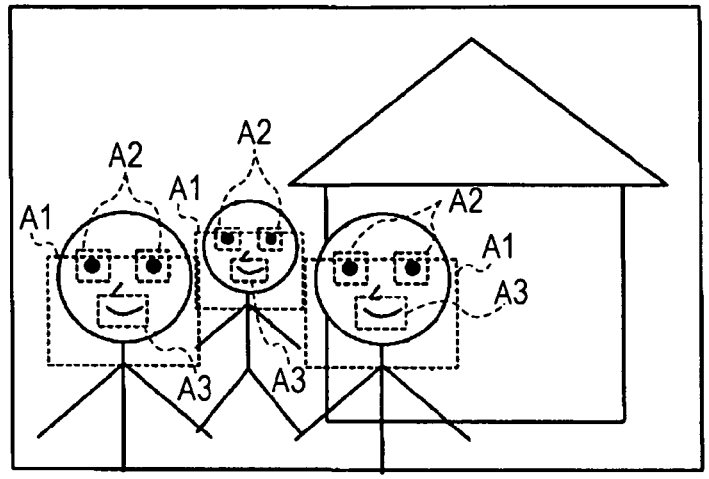
FIG. 7
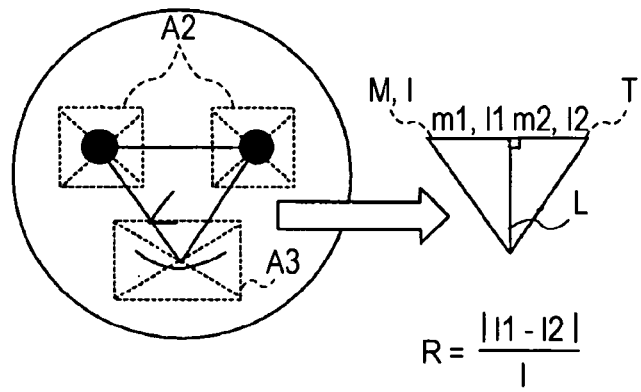
$$R = \frac{|l1 - l2|}{l}$$
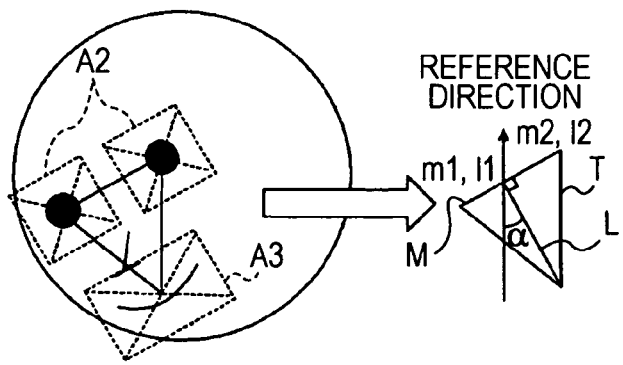

FIG. 8
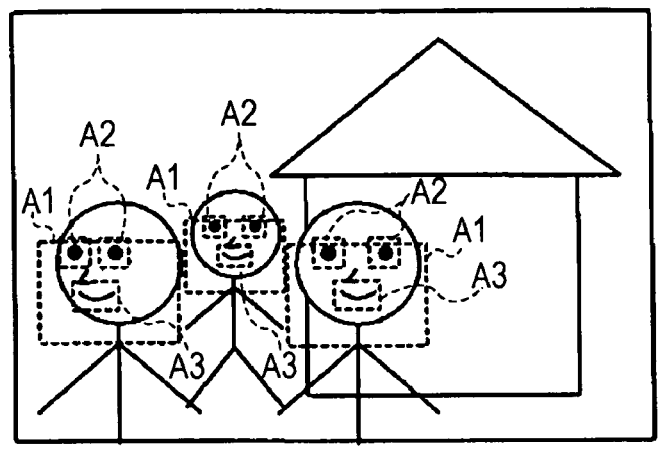
IMAGE DATA ID1
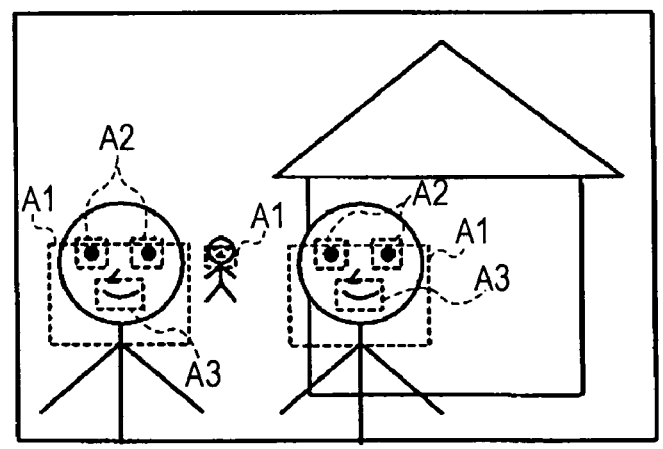
IMAGE DATA ID2
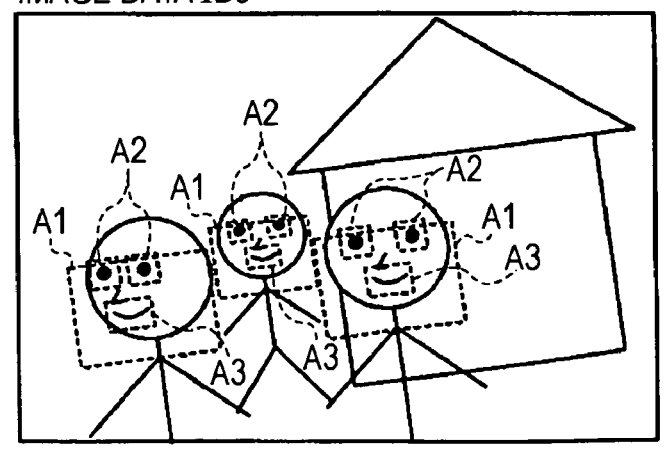
IMAGE DATA ID3

IMAGE OUTPUT METHOD, IMAGE OUTPUT DEVICE, AND IMAGE OUTPUT PROGRAM

BACKGROUND

1. Technical Field

The present invention relates to an image output method, an image output device, and image output program and, more particularly, to an image output method, an image output device, and an image output program, which are capable of outputting image data including portrait.

2. Related Art

With the rapid spread of a digital still camera, a user possesses plural pieces of image data. Accordingly, it is important how to manage the plural pieces of image data. In addition, since the digital still camera has a continuous shooting function, plural pieces of different image data representing similar images are stored in a storage. Even when plural pieces of image data representing similar images are present, mostly, any one of the plural pieces of image data is printed and thus the user selects any one of the plural pieces of image data. In such a situation, the selection of optimal image data based on a face turning angle to the front is suggested (see JP-A-2004-361989). In JP-A-2004-361989, photographing of image data suitable for photographer's desire is possible by selecting image data having a small face turning angle to the front.

However, if the digital still camera cannot be horizontally held, a face itself faces the front, but the face rotates relative to an image frame. In such a case, even when the method of JP-A-2004-361989 is applied, image data including the face rotated relative to image is selected as the image data suitable for photographer's desire. That is, the central axis of the face is preferably parallel or perpendicular to the image frame, and the selection according to such desire cannot be performed.

SUMMARY

An advantage of some aspects of the invention is that it provides an image output method, an image output device, and an image output program, which are capable of selecting image data having a face image having a good face angle.

According to an aspect of the invention, when predetermined image data is output from plural pieces of image data, first, a group including plural pieces of image data which are similar to each other is acquired. Next, a face turning angle with respect to a face image plane included in an image indicated by each image data belonging to the same group is detected and a face rotation angle indicating a rotation angle in the face image plane is also detected. Then, among the image data belonging to the same group, image data, in which the face turning angle and the face rotation angle are smaller than those of other image data, is output. By this configuration, the image data in which the face faces the front and the face rotation angle in the image plane is small can be output.

In addition, even when the face faces the front and does not rotate, if the face is excessively small, the image data is improper as a person image. Accordingly, among the image data belonging to the same group, the image data, in which the face turning angle and the face rotation angle are smaller than those of the other image data and the face is larger than that of the other image data, may be output. By this configuration, it is possible to output proper image data.

In addition, as an example of a method of detecting the face turning angle and the face rotation angle, first, two eyes and a mouth of the face included in the image indicated-by each image data belonging to the same group may be detected, and the face turning angle and the face rotation angle may be detected on the basis of the positional relationship between the eyes and the mouth. In addition, if the predetermined image data is output from the group including a large amount of image data, an efficient process with a small load is required.

Accordingly, when the face turning angle and the face rotation angle of the face included in the image indicated by each image data are detected, a thumbnail image attached to each image data may be used. Since the thumbnail image has a small image size, the efficient process with the small load can be achieved.

In addition, the technical spirit of the invention may be implemented in the specific image output method and the method may be implemented in the image output device. That is, the invention may be specified as the image output device including the units corresponding to the steps performed by the image output method. When the above-described image output device reads a program and realizes the above-described units, the technical spirit of the invention can be implemented in a program for executing the functions corresponding to the units or various types of recording mediums including the program recorded thereon. In addition, the image output device of the invention may be present in a single device or may be dispersed in a plurality of devices. For example, the units of the image output device may be dispersed in both a printer driver executed on a personal computer and a printer. In addition, the units of the image output device of the invention may be included in a printing device such as a printer.

BRIEF DESCRIPTION OF THE DRAWINGS

The invention will be described with reference to the accompanying drawings, wherein like numbers reference like elements.

FIG. 5 is a view showing an image database.

FIG. 6 is a view showing an example of the result of detecting facial organs.

FIG. 7 is a view showing a state of calculating a face turning angle and a face rotation angle.

FIG. 8 is a view showing an example of image data.

DESCRIPTION OF EXEMPLARY EMBODIMENTS

Hereinafter, the embodiment of the invention will be described in following order.

1. Configuration of Image Selection Device:
2. Flow of Image Selection Process:
3. Modified Example:

1. Configuration of Image Selection Device

Figure 1:
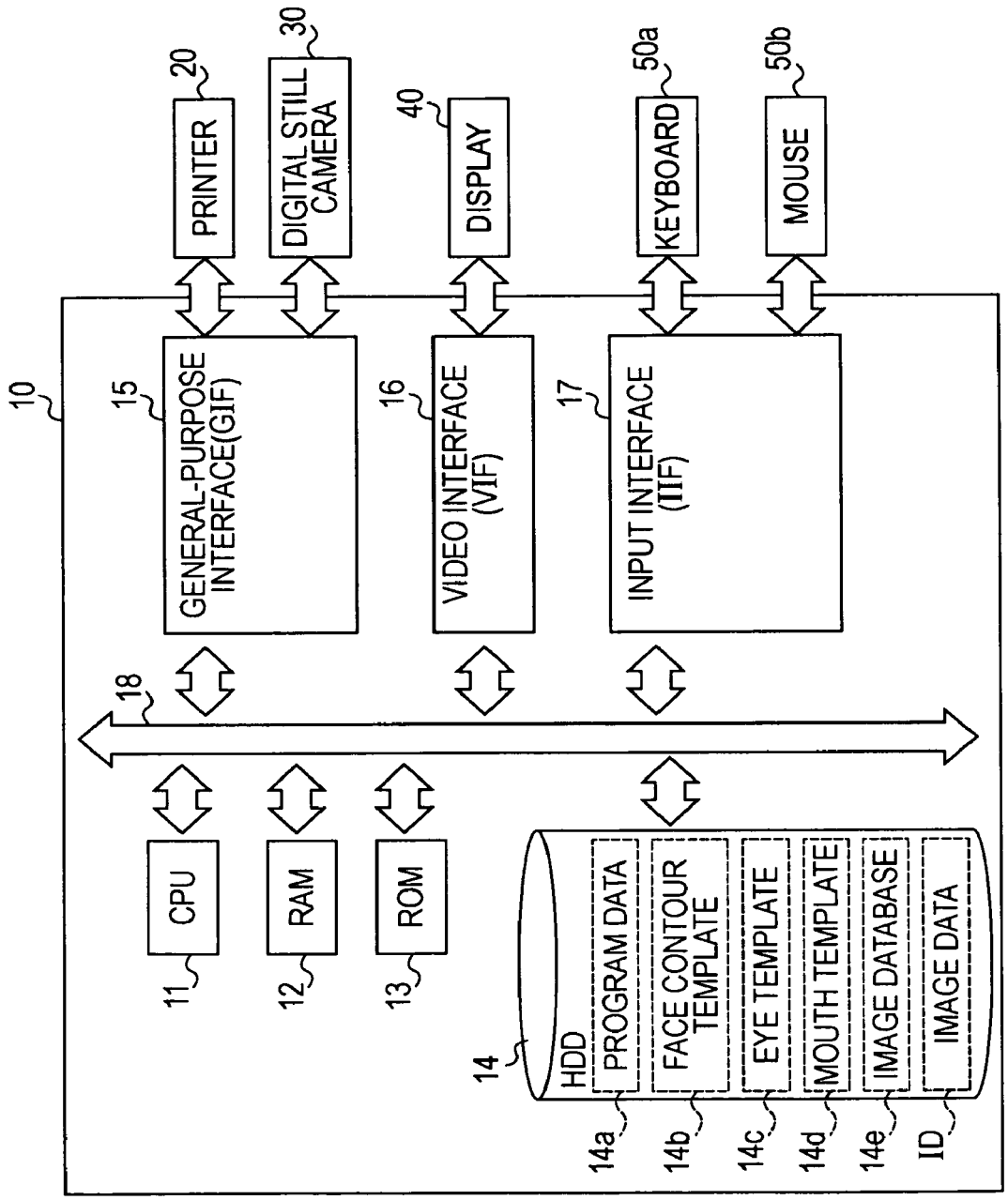
FIG. 1 is a block diagram showing the hardware configuration of an image output device.

FIG. 1 is a view showing the configuration of a computer for embodying an image selection device in detail as an image output device according to an embodiment of the invention. In the same figure, the computer 10 includes a CPU 11, a RAM 12, a ROM 13, a hard disc drive (HDD) 14, a general-purpose interface (GIF) 15, a video interface (VIF) 16, an input interface (IIF) 17, and a bus 18. The bus 18 realizes data communication between components 11 to 17 configuring the computer 10, the communication is controlled by a chip set (not shown). Program data 14*a* for executing various types of programs including an operating system (OS) is stored in the HDD 14, and the CPU 11 performs an operation based on the program data 14*a* while the program data 14*a* is developed to the RAM 12.

In addition, image data ID of image input by a digital still camera or a scanner, a plurality of face contour templates 14*b* used in pattern matching (described later), an eye template 14*c* and a mouth template 14*d* are stored in the HDD 14. In addition, an image database 14*e* generated by an image selection process (described later) is stored in the HDD 14. The GIF 15 provides, for example, an interface based on the USB standard and connects an external printer 20 or a digital still camera 30 to the computer 10. In addition, plural pieces of image data ID is stored in a flash memory (not shown) of the digital still camera 30. The VIF 16 connects the computer 10 to an external display 40 and provides an interface for displaying an image on the display 40. The IIF 17 connects the computer 10 to an external keyboard 50*a* and a mouse 50*b* and provides an interface for allowing the computer 10 to acquire input signals from the keyboard 50*a* and the mouse 50*b*.

Figure 2:
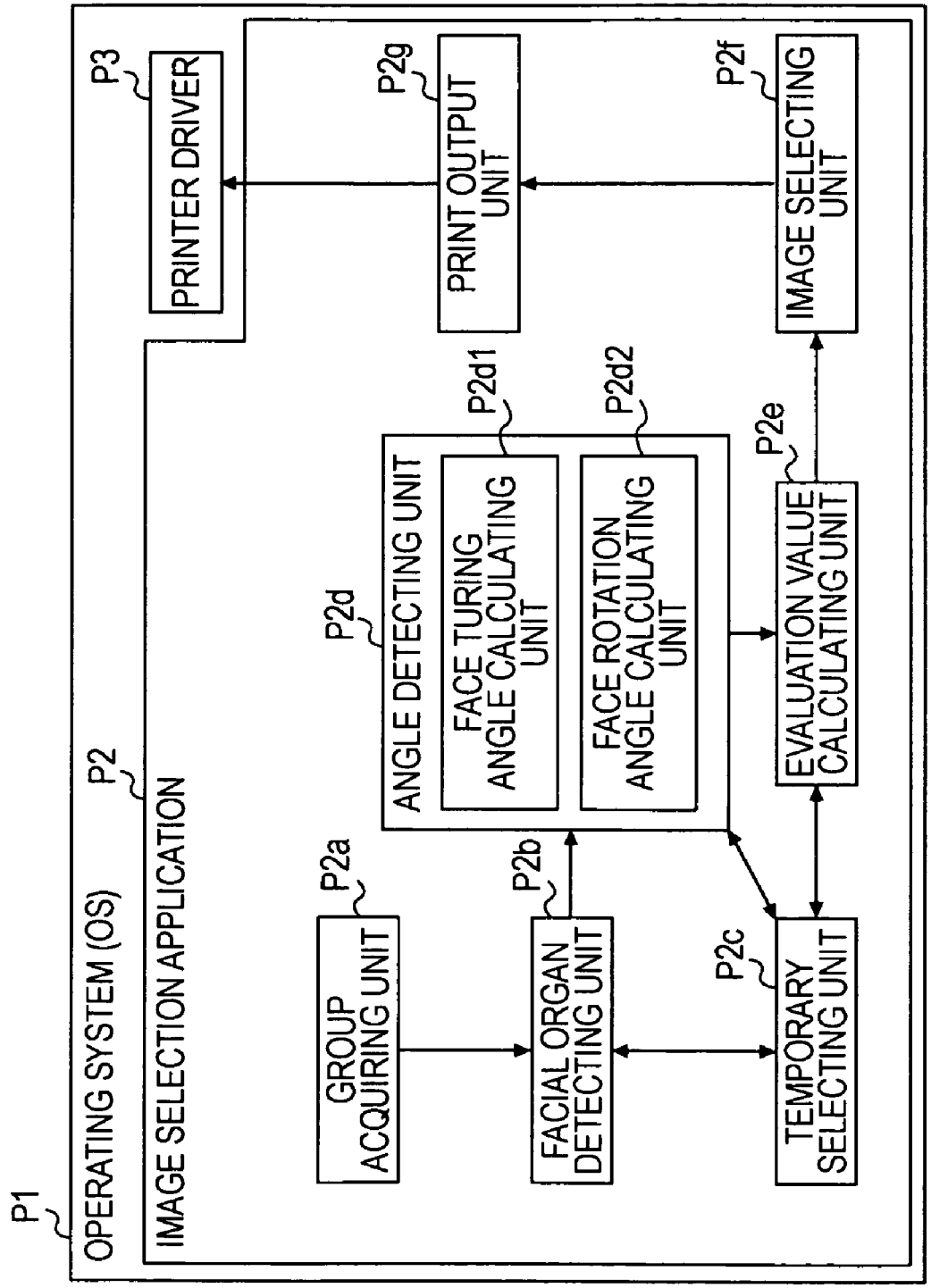
FIG. 2 is a block diagram showing the software configuration of the image output device.

FIG. 2 shows the software configuration of a program executed in the computer 10. In the same figure, an operating system (OS) P1, an image selection application P2, and a printer driver P3 are executed. The OS P1 provides an interface between programs, and the printer driver P3 executes a process for controlling the printer 20. The image selection application P2 includes a group acquiring unit P2*a*, a facial organ detecting unit P2*b*, a temporary selecting unit P2*c*, an angle detecting unit P2*d*, an evaluation value calculating unit P2*e*, an image selecting unit P2*f*, and a print output unit P2*g*. In addition, the angle detecting unit P2*d* includes a face turning angle calculating unit P2*d*1 and a face rotation angle calculating unit P2*d*2. The details of the process of executing the modules P2*a* to P2*g* configuring the image selection application P2 will be described together with a flow of an image selection process (described later).

2. Flow of Image Selection Process

Figure 3:
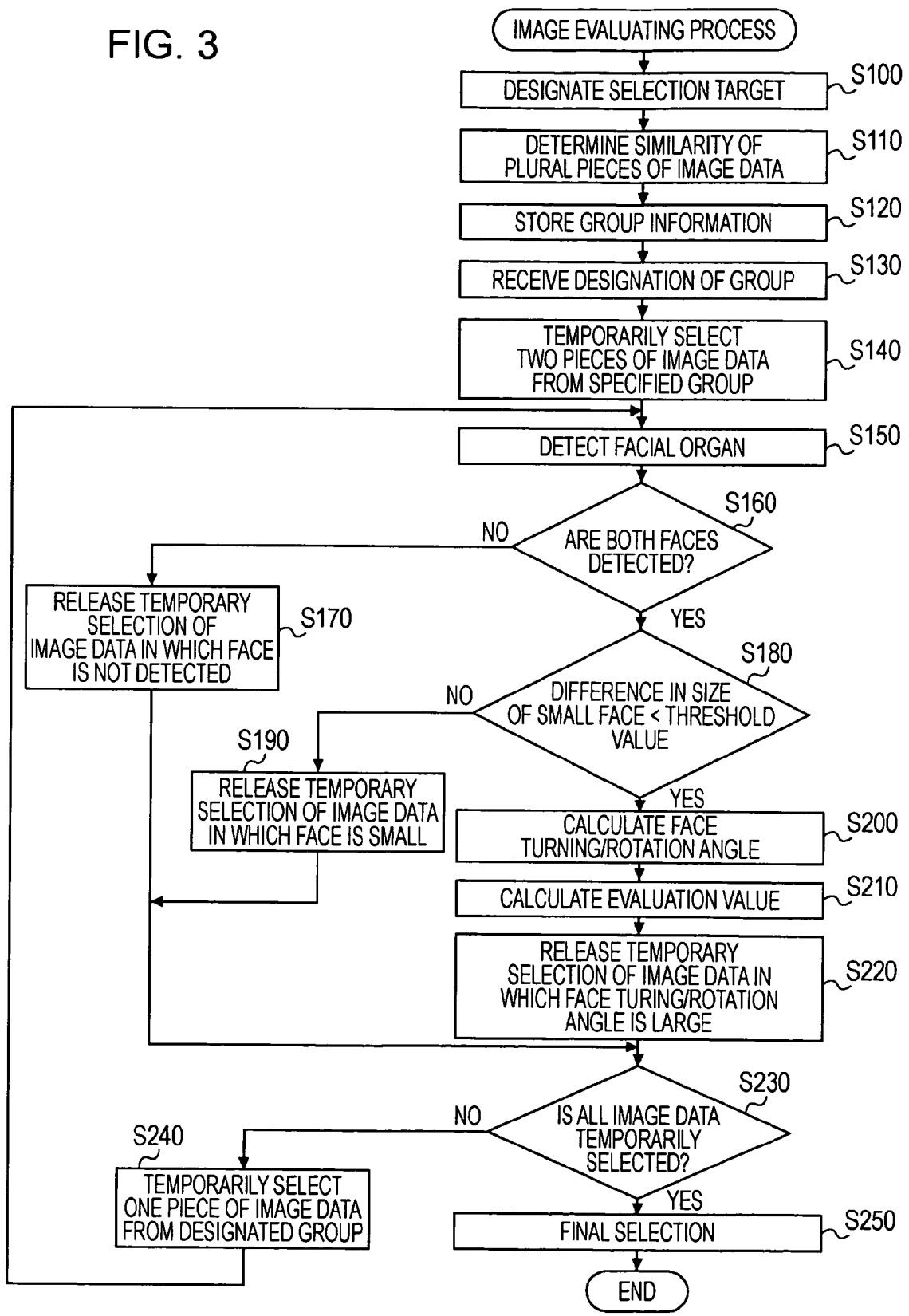
FIG. 3 is a flowchart showing the flow of an image selection process.

FIG. 3 is a view showing the flow of the image selection process. In a step S100, the group acquiring unit P2*a* displays a predetermined UI screen on the display 40 and receives an operation for designating an image selection target range via the keyboard 50*a* and the mouse 50*b*. For example, a directory structure of the HDD 14 or the digital still camera 30 may be displayed, an image data group constituted by the plural pieces of image data ID which are the image selection targets may be selected, and the image data ID which are the image selection targets may be searched for on the basis of attached information of the image data ID such as a photographing date or an updated date.

In a step S110, the plural pieces of image data ID selected in the step S100 is acquired by the group acquiring unit P2*a*, and a group (corresponding to a group of the invention) configured by similar image data ID is acquired by determining similarity of the image data ID. The group acquiring unit P2*a* determines the similarity of the image data ID on the basis of color information of images indicated by the image data ID and photographing times of the image data ID. In addition, in the image data ID of the present embodiment, thumbnail images obtained by reducing the images indicated by the image data ID is embedded as an Exif format in advance. In addition, attached information such as photographing times of the image data ID are also attached as tag information of the image data ID. In addition, the image data ID or the thumbnail images may be compressed by, for example, a JPEG method and may be properly developed to bit map data by a decoder (not shown) at the time of use.

Figure 4:
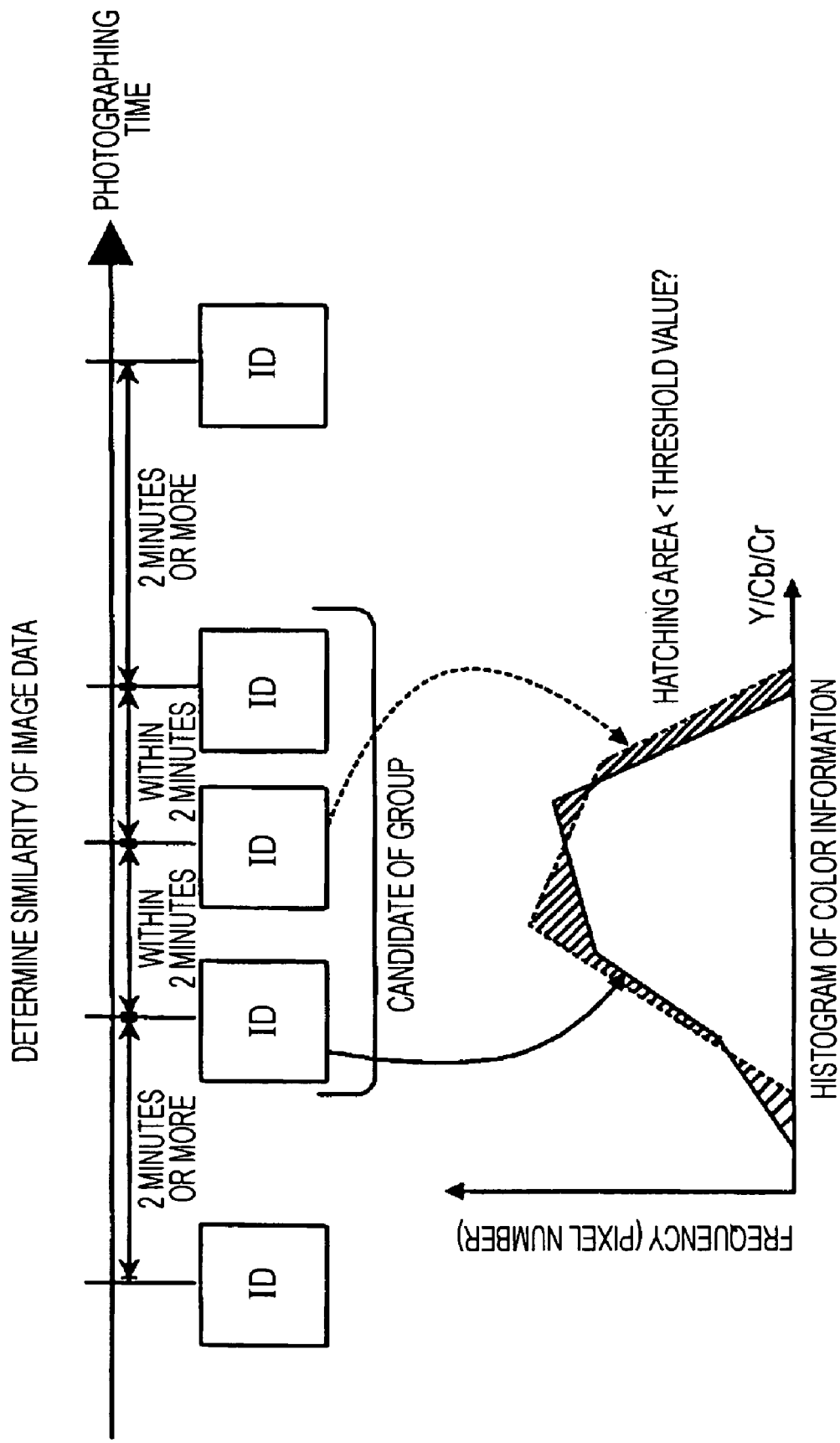
FIG. 4 is a view showing a state of determining similarity.

FIG. 4 is a view showing a state of determining similarity. In the upper side of the same figure, the state of determining the similarity of the image data ID on the basis of a difference (horizontal axis) between the photographing times in a set of image data ID is shown. If photographing is performed using a continuous shooting function or plural times of photographing are performed in the same composition, the images indicated by the image data ID are similar and the photographing times thereof are also close to each other. Accordingly, in the present embodiment, the similarity is determined whether a difference between the photographing times is equal to or less than a threshold value (2 minutes), and a series of image data ID photographed with the difference being equal to or less than the threshold value becomes the candidates of the group. For example, a person actually determines the similarity of the image data ID of a plurality of samples and statistically obtains the difference between the photographing times of the similar images, thereby setting the threshold value. Since the image may not be similar although the photographing times are close to each other, the similarity of the image data ID is then determined on the basis of the color information.

In the lower side of FIG. 4, a histogram used when the similarity of the image data ID is determined on the basis of the color information of the images indicated by the image data ID is shown. In the histogram, the frequency of the color information (for example, Y gray level of a YCbCr color system) of the thumbnail images of two pieces of image data ID which are determined to the candidates belonging to the same group based on the photographing times is shown. If the images indicated by the image data ID are similar to each other, it may be estimated that the shapes of the histograms thereof are also similar. An accumulated value (a value corresponding to a hatching area) of a difference between the frequencies of the thumbnail images of the two pieces of image data ID is calculated, and it is determined that the two pieces of image data ID are similar if the accumulated value does not exceed a predetermined threshold value. In contrast, if the accumulated value exceeds the predetermined threshold value, it is determined that the two pieces of image data ID are not similar. That is, the group formed based on the photographing times is subdivided by the determination of the similarity based on the color information. If the grouping of the similar image data ID is completed, the grouped result is stored in the image database 14*e* in a step S120.

FIG. 5 is a view showing the image database 14*e*. In the same figure, the group of the image data ID is stored. In a step S130, the UI screen is displayed on the display 40 and designation for which group a process of selecting a preferable image data ID is executed is received. In addition, all image data ID belonging to a group G1 are obtained by photographing a plurality of persons in the front of a house and are determined to be similar to each other. Since such photographs are generally photographed without a time interval and the compositions thereof are not largely changed, the color information is similar. In the step S110, the UI screen for allowing one of a plurality of groups to be selected is generated and is displayed on the display 40. At this time, it is preferable that it is checked which image data ID is included in each group by displaying the thumbnail of any image data ID of each group.

Here, the following description will be made in a state in which it is assumed that the group G1 is selected. In a step S140, two pieces of image data ID are temporarily selected by the temporary selecting unit P2*c* from the plural pieces of image data ID belonging to the selected group G1. The image data ID may be temporarily selected in random or may be temporarily selected in order of photographing times. In a step S150, the facial organ detecting unit P2b detects the facial organs from the thumbnail images attached to the two pieces of image data ID which are temporarily selected. In the present embodiment, a face contour, two eyes and a mouth are detected using the face contour template 14b, the eye template 14c and the mouth template 14d. Here, a face is detected from the image data ID by performing a known pattern matching method using a plurality of face contour templates 14b, eye templates 14c and mouth templates 14d.

In detail, the plurality of face contour templates 14b, eye templates 14c and mouth templates 14d are compared with an image of a rectangular comparison area formed in the thumbnail image corresponding to each image data ID, and it is determined that the facial organs are present in the comparison areas having high similarity with the face template 14b. By shifting the position, the size or the angle of this comparison area, it is possible to sequentially detect the faces included in portions of the image data ID. In addition, the sizes of the facial organs can be detected from the size of the comparison area having high similarity with the face contour template 14b, the eye template 14c and the mouth template 14d. The face contour template 14b, the eye template 14c and the mouth template 14d are rectangular image data, and the position, the size and the angle of the rectangle including the facial organs are detected.

FIG. 6 is a view showing an example of the result of detecting the facial organs. In the same figure, a rectangular area A1 including a face contour is specified in correspondence with a plurality of faces which is present in the thumbnail image corresponding to each image data ID. The size and the position of the face can be determined by the size of this rectangular area A1. In addition, a rectangular area A2 including left and right eyes and a rectangular area A3 including a mouth are detected. In a step S160, it is determined whether or not the face is detected from both the thumbnail images corresponding to the two pieces of image data ID which are temporarily selected. It can be determined whether or not the face is detected by determining whether or not at least one rectangular area A1 including the face contour is detected. In addition, it may be determined that one face is detected, by the detection of two rectangular areas A2 each including the eye and one rectangular area A3 including the mouth in the vicinity of one rectangular area A1 as the facial organs with a proper arrangement as well as the rectangular area A1 of the face contour.

If the face is detected in only one piece of image data ID, in a step S170, the temporary selection of the other image data ID in which the face is not detected is released by the temporary selecting unit P2c. In addition, if the face is not detected in both the two pieces of image data ID, in a step S170, the temporary selection of any one image data ID is released by the temporary selecting unit P2c. In addition, since the group G1 of all image data ID obtained by photographing the plurality of persons in front of the house is selected, it is determined that the plurality of faces are detected from the thumbnail images corresponding to both the image data ID. If the faces are detected from the thumbnail images corresponding to both the image data ID, in a step S180, the temporary selecting unit P2c specifies a smallest face in each image data ID among the faces detected from the thumbnail images corresponding to the two pieces of image data ID from the result of detecting the facial organs.

On the basis of a smallest area of rectangular areas A1 detected from the thumbnail images, the size of the smallest face in the thumbnail image corresponding to each image data ID can be specified. In addition, a difference between the sizes of the smallest faces (the sizes of the smallest rectangular areas A1) in the thumbnail images is calculated, and it is determined whether or not the difference between the sizes exceeds a predetermined threshold value. For example, if the difference between the widths of the rectangular areas A1 including the face contour, which are detected from the two pieces of image data ID, is likely to exceed about 10% of the whole width of the image data ID, it is determined that the difference between the sizes of the faces exceeds the predetermined threshold value.

If it is determined that the difference between the sizes of the faces exceeds the predetermined threshold value, in a step S190, it is determined that one image data ID including the smallest face is non-preferable image data ID, and the temporary selecting unit P2c releases the temporary selection thereof. By this operation, it is possible to exclude the image data ID including the smallest face than the other image data ID from the selection target. In contrast, if it is determined that the difference between the sizes of the faces does not exceed the predetermined threshold value, in a step S200, the angle detecting unit P2d calculates a face turning angle and a face rotation angle of each of the faces included in the thumbnail images corresponding to the two pieces of image data ID, and the evaluation value calculating unit P2e calculates face evaluation values on the basis of the face turning angle and the face rotation angle.

FIG. 7 is a view showing a state of calculating the face turning angle and the face rotation angle by the angle detecting unit P2d. By analyzing the shape of a triangle T formed by connecting the centers of the two rectangular areas A2 each including the eye and one rectangular area A3 including the mouth located in the vicinity of one rectangular area A1 including the face contour, the face turning angle and the face rotation angle are calculated. In the face rotation angle calculating unit P2d2, a straight line which is perpendicular to a segment M connecting the centers of the two rectangular areas A2 each including eye and passes through the center of the rectangular area A3 including the mouth is a central axis L of the face. In addition, an inclined angle of the central axis L1 relative to a direction (reference direction) of the left and right sides of the thumbnail image corresponding to the image data ID is calculated as the face rotation angle a. By this operation, the inclination of the central axis L of the face relative to the reference direction in the image plane can be calculated as the face rotation angle $\alpha$. In addition, when the face rotation angle $\alpha$ larger than 45 degrees is calculated, (90-$\alpha$) is set to the face rotation angle $\alpha$. Accordingly, even when the photographing direction of the image data ID is a portrait or a landscape, the face rotation angle a can be properly evaluated.

Meanwhile, the face turning angle calculating unit P2d1 calculates the lengths 11 and 12 of segments m1 and m2 obtained by dividing the segment M connecting the center of the rectangular areas A2 each including the eye by the central axis L. By dividing a difference $\Delta 1$ between the lengths 11 and 12 by the whole length 1 of the segment M, a length ratio R is calculated. Here, when the difference $\Delta 1$ is 0 (R=0), it may be considered that the face faces the image plane in a vertical direction and has a face turning angle $\beta$ of 0 degrees with respect to the vertical line of the image plane (That is, is not inclined). Meanwhile, when the difference $\Delta 1$ is equal to the whole length 1 of the segment M (R=1), it may be considered that the face has a face turning angle $\beta$ of about ±45 degrees with respect to the vertical line of the image plane. If the face turning angle $\beta$ corresponding to the length ratio R=0 to 1 is linearly estimated, the face turning angle β corresponding to any length ratio R may be calculated to (R×45) degrees.

If the face rotation angle α and the face turning angle β can be calculated, the evaluation value calculating unit P2e calculates a face angle evaluation value E by Equation (1).

$$E = w1 \times \alpha + w2 \times \beta \quad (1)$$

In Equation (1), w1 and w2 denote weight coefficients for setting to which of the face rotation angle α and the face turning angle β importance is attached. For example, if the importance is attached to the face rotation angle α, the coefficient w1 is larger than the coefficient w2. In the present embodiment, w1=w2=0.5 and the same importance is attached to the face rotation angle α and the face turning angle β. It may be determined that the face rotation angle α and the face turning angle β are large in total if the face angle evaluation value E is large and it is determined that the face rotation angle α and the face turning angle β are small in total if the face angle evaluation value E is small. In a step S200, the face angle evaluation values E are calculated with respect to all the faces detected from the thumbnail images corresponding to the two pieces of image data ID.

In a step S210, a largest value of the calculated face angle evaluation values E is detected with respect to each of the two pieces of image data ID. That is, the face angle evaluation value E of a face of which the face rotation angle α and the face turning angle β are largest in total is detected in each of the two pieces of image data ID. In a step S220, the largest face angle evaluation values E of the two pieces of image data ID detected in the step S210 are compared. Then, the temporary selecting unit P2c releases the temporary selection of the image data ID having a larger face angle evaluation angle E.

By the above process, the temporary selection of preferable image data of the two pieces of image data ID may be maintained and the temporary selection of non-preferable image data thereof may be released. Accordingly, in a step S220, one piece of image data ID is temporarily selected. In a step S230, it is determined whether or not all image data ID belonging to the group G1 is temporarily selected in the steps S140 and S240. Here, if all the image data ID is not temporarily selected in the steps S140 and S240, in the step S240, one piece of image data ID of the group G1 which is not temporarily selected yet is temporarily selected and the process after the step S150 is repeatedly executed.

391In the process after the step S150 which is repeatedly executed, the image data ID of which the temporary selection is maintained by the previous process and the new image data ID which is temporarily selected in the step S240 are compared and the temporary selection of the preferable image data is maintained. By performing such a loop, the temporary selection of the image data ID having the small face angle evaluation value E in the group G1 can be finally maintained. In the step S230, if it is determined that all the image data ID belonging to the group G1 is temporarily selected in the steps S140 and S240, in a step S250, the image data ID of which the temporary selection is currently maintained by the image selecting unit P2f is selected as a most preferable image data ID.

By this process, the image data ID having the smallest face rotation angle α and face turning angle β in the group G1 can be finally selected, for example, and the selected image data ID can be output to the printer driver P3 by the print output unit P2g and can be printed by the printer 20. In addition, since the process after the step S150 is performed several times with respect to the same image data ID, it is preferable that the smallest face size or largest face angle evaluation value E of the image data ID which is previously calculated is stored in the RAM 12 or the HDD 14 and is read and used when necessary.

FIG. 8 is a view showing an example of image data ID belonging to the group G1. In the same figure, three pieces of image data ID1, ID2 and ID3 are shown. The image data ID1, ID2 and ID3 is obtained by photographing a plurality of persons in front of a house. However, since the persons are moved, the positions, the sizes or the angles of the plurality of faces are different. In the present embodiment, if attention is focused on a smallest face of the plurality of faces and the smallest face is less than a comparison target by the predetermined threshold value or more, the temporary selection thereof is released (step S190). Here, the case where the image data ID1 and ID2 are temporarily selected is considered. In addition, the rectangular area A1 corresponding to the smallest face in the image data ID2 is smaller than the rectangular area A1 corresponding to the smallest face in the image data ID1, and the difference thereof is larger than the predetermined threshold value (10% of the whole width of the thumbnail image). In this case, in the step S190, the temporary selection of the image data ID2 is released. The image including an extremely small face like the image data ID2 is improper as a group photograph and the selection of such image data ID2 can be avoided.

Next, the case where the image data ID1 and ID3 are temporarily selected is considered. The sizes of the plurality of faces included in the images (thumbnail images) indicated by the image data ID1 and ID3 are equal. In this case, in the step S190, the largest face angle evaluation values E are compared in the step S220 without releasing the temporary selection of any one of the image data ID1 and ID3 in the step S190. That is, among the plurality of faces included in the images (thumbnail images) indicated by the image data ID1 and ID3, the faces of which the face rotation angle α and the face turning angle β are largest in total are compared, and the temporary selection of one of the image data ID1 and ID3, in which the face rotation angle α and the face turning angle β are large, is released. In the image ID1 and ID3, the face turning angles β of the faces having the largest face angle evaluation value E are equal. However, the face rotation angle α of the face having the largest face angle evaluation value E in the image data ID3 is large, and the temporary selection of the image data ID3 is released. Since the face rotation angle α as well as the face turning angle β is determined in total, it may be determined whether or not the digital still camera has a proper angle with the face of a subject.

3. Modified Example

Although the coefficient w1=w2=0.5 in the above-described embodiment, the coefficients w1 and w2 may be adjusted according to the composition of the group which is an image selection target or the preference of the user. For example, the coefficients w1 and w2 may be adjusted according to the number of faces detected, and the user may determine which of the coefficients holds importance. In addition, although the two pieces of image data ID belonging to the same group G1 are sequentially compared, the face angle evaluation values E of all image data ID may be simultaneously calculated and a most preferable (smallest) face angle evaluation value E may be searched for. In addition, although the determination is performed on the basis of the largest face angle evaluation value E of the faces of the image indicated by the image data ID, the determination may be performed on the basis of the average value of the face angle evaluation values E of the plurality of faces.

What is claimed is:

1. An image output method, comprising:

acquiring a group including plural pieces of image data which are similar to each other;

detecting, for each piece of image data belonging to the group, a face turning angle with respect to a face image plane included in an image indicated by the piece of image data and a face rotation angle indicating a rotation angle of a face in the face image plane; and outputting a piece of image data in which the face turning angle and the face rotation angle are smaller than those of other pieces of image data belonging to the group and in which the face is larger than that of the other pieces of image data belonging to the group.

2. An image output method, comprising:

acquiring a group including plural pieces of image data which are similar to each other;

detecting, for each piece of image data belonging to the group, a face turning angle with respect to a face image plane included in an image indicated by the piece of image data and a face rotation angle indicating a rotation angle of a face in the face image plane; and outputting a piece of image data in which the face turning angle and the face rotation angle are smaller than those of other pieces of image data belonging to the group;

wherein the face turning angle and the face rotation angle are detected on the basis of a thumbnail image attached to each piece of image data.

3. An image output device, comprising:

a group acquiring unit acquiring a group including plural pieces of image data which are similar to each other;

a detecting unit detecting, for each piece of image data belonging to the group, a face turning angle with respect to a face image plane included in an image indicated by the piece of image data and a face rotation angle indicating a rotation angle of a face in the face image plane; and a selecting unit outputting a piece of image data in which the face turning angle and the face rotation angle are smaller than those of other pieces of image data belonging to the group and in which the face is larger than that of the other pieces of image data belonging to the group.

4. A non-transitory computer-readable medium having a program stored thereon for causing a computer to execute a function for outputting image data, the function comprising:

a group acquiring function acquiring a group including plural pieces of image data which are similar to each other;

a detecting function detecting, for each piece of image data belonging to the group, a face turning angle with respect to a face image plane included in an image indicated by the piece of image data and a face rotation angle indicating a rotation angle of a face in the face image plane; and a selecting function outputting a piece of image data in which the face turning angle and the face rotation angle are smaller than those of other pieces of image data belonging to the group and in which the face is larger than that of the other pieces of image data belonging to the group.

* * * * *